United States Patent [19]

Poisel et al.

[11] Patent Number: 5,040,869
[45] Date of Patent: Aug. 20, 1991

[54] DUPING ARRANGEMENT FOR LASER DISTANCE MEASURING DEVICES

[75] Inventors: Hans Poisel, Dachau; Ernst-A. Seiffarth, Taufkirchen; Gert Trommer, Munich, all of Fed. Rep. of Germany

[73] Assignee: Messerschmitt-Bölkow-Blohm GmbH, Fed. Rep. of Germany

[21] Appl. No.: 547,038

[22] Filed: Jul. 2, 1990

[30] Foreign Application Priority Data

Jul. 8, 1989 [DE] Fed. Rep. of Germany ....... 3922572

[51] Int. Cl.$^5$ .............................................. G02B 6/04
[52] U.S. Cl. ...................................... 385/115; 356/5; 385/33
[58] Field of Search .............. 356/5; 350/96.15, 96.18, 350/96.24, 96.25

[56] References Cited

U.S. PATENT DOCUMENTS

| | | | |
|---|---|---|---|
| 3,740,141 | 6/1973 | DeWitt | 356/5 |
| 4,181,431 | 1/1980 | Chaborski | 356/5 |
| 4,553,836 | 11/1985 | Meier et al. | 356/5 |

Primary Examiner—John D. Lee
Attorney, Agent, or Firm—Evenson, Wands, Edwards, Lenahan & McKeown

[57] ABSTRACT

A duping arrangement is provided for a laser distance measuring device in which the illuminated object sends to the transmitter an identical but time-delayed signal and, therefore, supplies the transmitter with an incorrect distance reading. The duping arrangement comprises a wide-angle optical system formed by a bundle of glass fibers, a fiber delay line and a phase-conjugated optical element that is operated in an externally pumped mode or a self-pumped mode.

6 Claims, 2 Drawing Sheets

GLASS FIBER BUNDLE
GLASS FIBER

END FACE
GLASS FIBER

EXTERNALLY OR SELF-PUMPED BEAM BUNDLE
PHASE-CONJUGATING MIRROR (CRYSTAL)

DUPING ARRANGEMENT FOR LASER DISTANCE MEASURING DEVICES

BACKGROUND AND SUMMARY OF THE INVENTION

The present invention relates to a duping arrangement or decoy device for laser distance measuring devices, and, more particularly, to a duping arrangement in which an identical but time-delayed signal is sent to the transmitter by the illuminated object.

Several types of duping arrangements are already known. They are based, however, on passive as well as active duping methods. The disadvantage of a passive construction utilizing mirrors is that the reflection energy is too low because of the small cross-sectional surface size of the entry optical system in proportion to the entire surface of the illuminated object. Known active constructions using lasers require relatively high expenditures because, for each possible wavelength of the arriving irradiation, a separate laser must be used that has the same wavelength.

DE-OS 24 08 058 shows a known interference method in which a laser distance measuring device is provided on the ground for combatting low-flying planes, and is combined with fire guiding radar. The interval between the first and the second ground laser pulse is determined and triggers an interference pulse in the case of a board laser which, when the third pulse of the ground laser is received, in a time-delayed manner, is beamed into the direction of the ground laser. This construction requires very high optical and electronic expenditures since the laser transmitter as well as the laser warning receiver, which is assigned specifically to this laser transmitter, must be equipped with their own optical system. In addition, amplifiers, frequency meters, a delay logic and special controls, and the like are also required.

DE-OS 36 09 834 shows another known construction in which the irradiation received as the laser measuring irradiation and to be affected by the interference is radiated as interference irradiation in a time delayed manner. For this purpose, a laser transmitter situated at the illuminated object is triggered by the delayed received irradiation, the delay being achieved by a fiber-optical wave guide of the desired length, or irrespective of the reception of a laser irradiation to be disturbed, uncorrelated laser interference pulses are emitted continuously into all directions of space. In this case also, the optical and electronic expenditures are considerable, apart from the fact that there exist the initially mentioned disadvantages for the previously known passive and active solutions.

It is an object of the present invention to provide a duping device which not only significantly reduces the optical and electronic expenditures but is also significantly improved with respect to its output and intensity.

The foregoing object is achieved by utilizing a duping arrangement comprising a wide-angle optical system, a fiber delay line and a phase-conjugated element.

BRIEF DESCRIPTION OF THE DRAWINGS

These and other objects, features and advantages of the present invention will become more apparent from the following detailed description of a presently preferred embodiment when taken in conjunction with the accompanying drawings wherein.

DETAILED DESCRIPTION OF THE DRAWINGS

Figure 1:
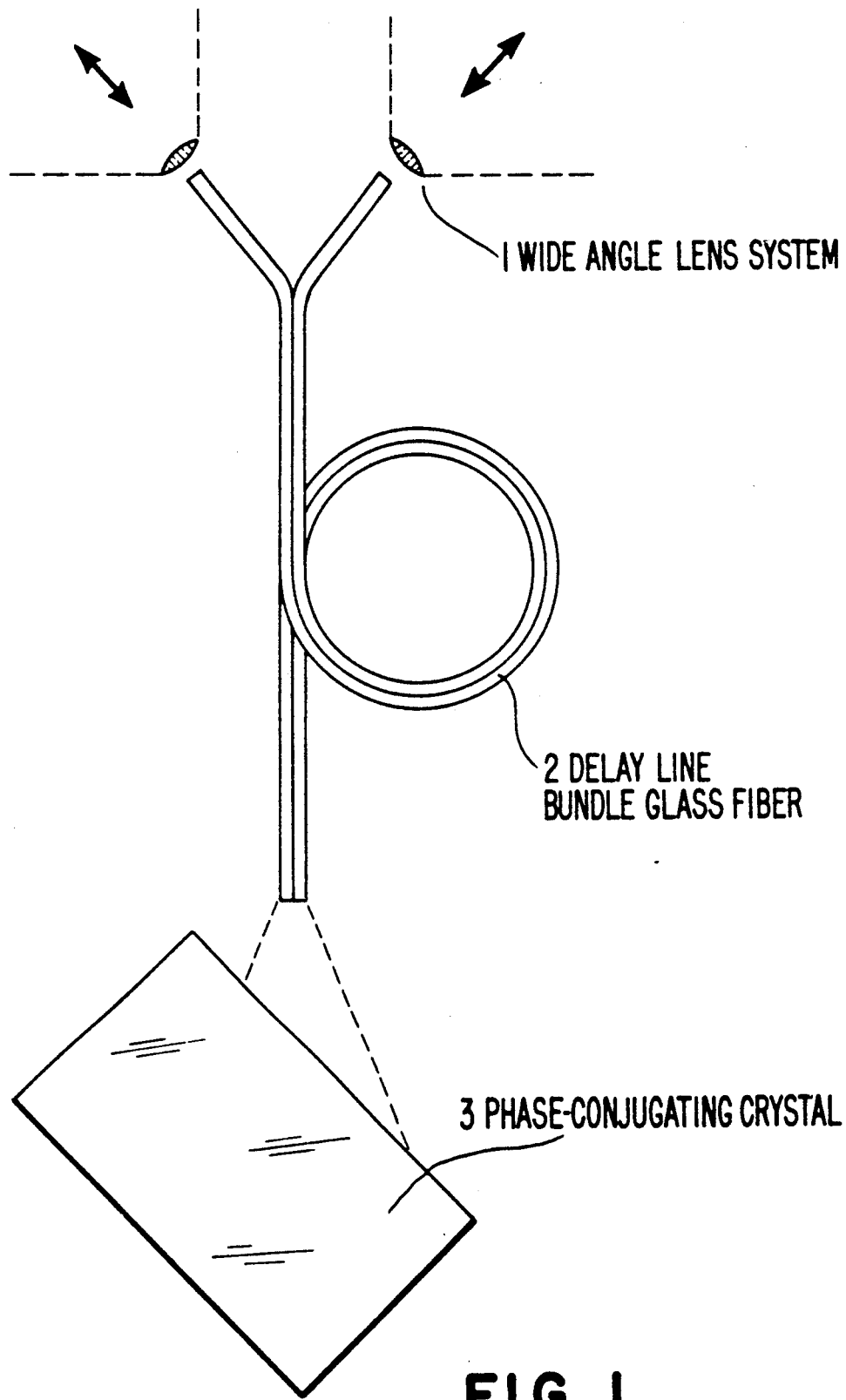
FIG. 1 is a schematic view of one embodiment of the duping arrangement or decoy device according to the present invention.
Figure 2:
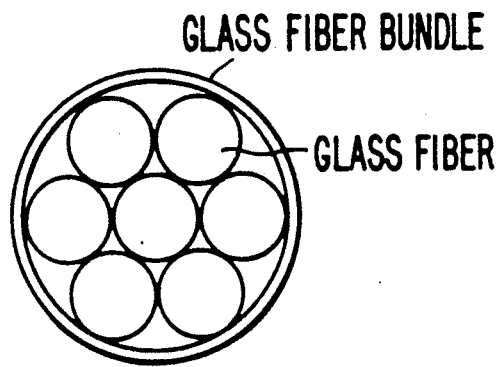
FIG. 2 is a top view of the end of a bundle of glass fibers with flat end surfaces.
Figure 3:
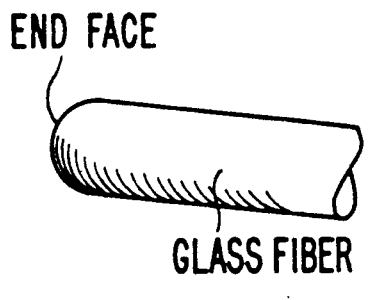
FIG. 3 is a partial view of the glass fibers whose end surfaces are ground in a rounded shape.
Figure 4:
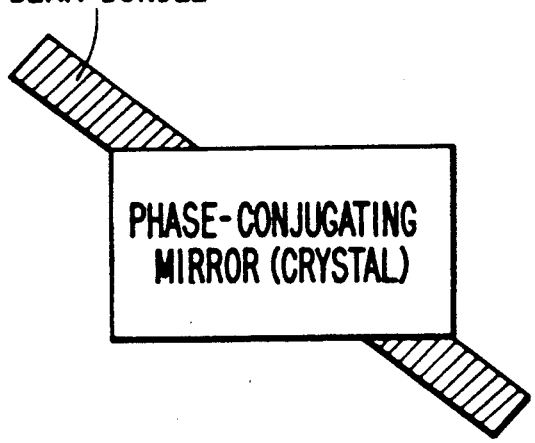
FIG. 4 is a schematic view of external or internal pumped radiation to the mirror or crystal.

The duping arrangement of the present invention comprises a wide-angle optical system 1, a fiber delay line 2, and a phase-conjugated mirror element 3. The optical system is formed of a bundle of a few glass fibers of a high numerical aperture without any lenses. The bundle of glass fibers of the system can have cylindrically ground end faces. Such elements have been used as mirrors per se, but heretofore it had not recognized that such mirrors can be used optimally as duping arrangements for laser measuring distances. By using the phase-conjugated mirror instead of conventional reflection devices, irradiation impinging on the wide-angle optical system 1, from a large field of view, despite the wide angle characteristic of the enter/exit optical system, is completely reflected back to the transmitter in a concentrated manner. Conventional devices which operate with normal mirrors require a set of numerous optical systems with a narrow field of view covering a large solid angle in order to be able to reflect back in a manner that is as concentrated as possible.

The light of the laser distance measuring device that is to be affected by the interference is supplied to a light wave guide by way of the wide-angle coupling-in optical system 1. After passing through a certain length of the light wave guide, the light impinges on a reflector at the object to be protected. Up to now, this, as a rule, was a simple mirror but the reflected output which, after passing through the length (L) of the light wave guide LWL again—thus after the return—exits from it again and emits over the whole opening angle of the wide-angle optical system, will arrive at the transmitting side only to a considerably reduced extent. In order to minimize this loss of output, additional amplifying devices have previously been used.

As a result of the passage through the light wave guide, the exiting beam is necessarily time-delayed in comparison to the directly reflected beam or signal, specifically by:

$$\Delta T = 2 \cdot L \, (LWL) \cdot n / c_o$$

wherein
n = the refraction index of the used fiber,
$c_o$ = the velocity of light in the vacuum.

In order to now eliminate the problem of the low output arriving at the receiver, it was recognized that the phase-conjugated mirror 3 may be used here. A mirror which is constructed as a $BaTiO_3$ crystal has been found to be very successful for this purpose. It has also been recognized that this crystal may be operated in an externally pumped or in a self-pumped mode. As a result of the characteristic of the phase-conjugated element 3 of precisely reversing the optical path of light, the returning—reflected—beam is shaped such that it arrives exactly back at the starting point.

As a result of the fact that practically all irradiation impinging on the entry optical system of the delay line or delay device in a concentrated manner, is reflected back to the emitting distance measuring device while the irradiation which is not time-delayed and which impinges on the remainder of the object, returns to the distance measuring device in a considerably weakened manner in the form of a spherical wave, the delayed irradiation, notwithstanding the smaller cross-sectional surface of the receiving/transmitting optical system, has a much higher intensity which greatly blankets the weaker light of the normal reflex and thus makes the latter ineffective. Hence, an incorrect measured value results for the laser rangefinder.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A duping arrangement for laser distance measuring devices in which a time-delayed signal identical to another signal sent by an illuminated object is sent to a transmitter and thus an incorrect distance reading is transmitted, comprising a wide-angle optical system, a phase conjugated element, and a fiber delay line operatively associated with the system and element so as to precisely reverse the optical path.

2. A duping arrangement according to claim 1, wherein the wide-angle optical system is formed of a bundle of a few glass fibers of a high numerical aperture without any lenses.

3. A duping arrangement according to claim 1, wherein the wide-angle optical system comprises a bundle of glass fibers spherically shaped end faces.

4. A duping arrangement according to claim 1, wherein a crystal of the phase-conjugated element is operated in an externally pumped or self-pumped mode.

5. A duping arrangement according to claim 4, wherein the wide-angle optical system is formed of a bundle of a few glass fibers of a high numerical aperture without any lenses.

6. A duping arrangement according to claim 4, wherein the wide-angle optical system comprises a bundle of glass fibers with spherically shaped end faces.

* * * * *